(12) United States Patent
Krampert et al.

(10) Patent No.: US 9,599,803 B2
(45) Date of Patent: Mar. 21, 2017

(54) BEAM COMBINER FOR COMBINING TWO INDEPENDENTLY SCANNED ILLUMINATING BEAMS OF A LIGHT SCANNING MICROSCOPE

(75) Inventors: Gerhard Krampert, Jena (DE); Michel Stutz, Munich (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 323 days.

(21) Appl. No.: 14/124,513

(22) PCT Filed: Jun. 8, 2012

(86) PCT No.: PCT/EP2012/060879
§ 371 (c)(1),
(2), (4) Date: Apr. 7, 2014

(87) PCT Pub. No.: WO2012/168423
PCT Pub. Date: Dec. 13, 2012

(65) Prior Publication Data
US 2016/0187634 A1    Jun. 30, 2016

(30) Foreign Application Priority Data

Jun. 9, 2011    (DE) .................. 10 2011 077 327

(51) Int. Cl.
*G02B 21/00*    (2006.01)
*G02B 27/10*    (2006.01)
*G02B 27/14*    (2006.01)

(52) U.S. Cl.
CPC ..... *G02B 21/0048* (2013.01); *G02B 21/0032* (2013.01); *G02B 21/0076* (2013.01); *G02B 27/108* (2013.01); *G02B 27/143* (2013.01)

(58) Field of Classification Search
CPC ............ G02B 21/0048; G02B 21/0032; G02B 21/0076; G02B 27/108; G02B 27/143
(Continued)

(56) References Cited

U.S. PATENT DOCUMENTS 5,691,839 A * 11/1997 Kobayashi ......... G02B 21/0048
348/E3.053
6,888,148 B2    5/2005 Wolleschensky et al.
(Continued)

FOREIGN PATENT DOCUMENTS

DE        10257237 A1    6/2003
DE    102004011770 A1    10/2005
(Continued)

OTHER PUBLICATIONS

International Search Report dated Aug. 22, 2012 issued in corresponding application No. PCT/EP2012/060879.
(Continued)

*Primary Examiner* — Frank Font
(74) *Attorney, Agent, or Firm* — Westerman, Hattori, Daniels & Adrian, LLP

(57) ABSTRACT

A beam combiner in a light scanning microscope for combining two illuminating beams that can be independently scanned. A first beam path (B1) guides a first illuminating beam (2) along a first optical axis (OA1) and a first optical device (L1) bundles the first beam (2) in an intermediate image plane. A second beam path (B2) guides a second illuminating beam (3) along a second optical axis (OA2) that intersects the first optical axis (OA1) at a point of intersection (Z) lying in or near the intermediate image plane, and a scanner (S2) for deflecting the second illuminating beam (3) and arranged before the point of intersection (Z) of the optical axes (OA1, OA2) in the propagation direction of the second illuminating beam (3). A coupling-in unit (4) is arranged at the point of intersection (Z) of the optical axes (OA1, OA2) and either has a mirror surface (5) having a passage opening (6; 7) at the point of incidence of the first optical axis (OA1), or is transparent except for a mirror element lying at the point of incidence of the first optical axis (OA1), wherein the size of the passage opening (6; 7)
(Continued)

or the mirror element corresponds to the cross-section that the first illuminating beam (2) at the point of incidence and thus allows the first illuminating beam to pass or reflects the first illuminating beam, wherein the first and second illuminating beams (2, 3) propagate as a combined illuminating beam (8) after the coupling-in unit (4).

13 Claims, 2 Drawing Sheets

(58) Field of Classification Search
USPC .......................................... 359/201.2, 205.1
See application file for complete search history.

(56) References Cited

U.S. PATENT DOCUMENTS

| | | | |
|---|---|---|---|
| 7,301,696 B2 | 11/2007 | Wolleschensky | |
| 7,605,976 B1* | 10/2009 | Wolleschensky | G01J 3/02 |
| | | | 359/385 |
| 7,782,529 B2* | 8/2010 | Knebel | G02B 21/0032 |
| | | | 359/368 |
| 2002/0163717 A1* | 11/2002 | Lee | G02B 21/0084 |
| | | | 359/388 |
| 2003/0044967 A1 | 3/2003 | Heffelfinger et al. | |
| 2006/0011858 A1* | 1/2006 | Engelmann | G02B 21/0076 |
| | | | 250/458.1 |
| 2007/0051869 A1* | 3/2007 | Knebel | G02B 21/0032 |
| | | | 250/201.3 |

FOREIGN PATENT DOCUMENTS

| | | |
|---|---|---|
| DE | 10 2004 016 253 A1 | 11/2005 |
| DE | 102004034983 A1 | 2/2006 |
| EP | 1953579 A1 | 8/2008 |

OTHER PUBLICATIONS

Notification of Transmittal of Translation of the International Preliminary Report on Patentability (Form PCT/IB/338) of International Application No. PCT/EP2012/060879 mailed Dec. 27, 2013 with Forms PCT/IB/373 and PCT/ISA/237.

* cited by examiner

BEAM COMBINER FOR COMBINING TWO INDEPENDENTLY SCANNED ILLUMINATING BEAMS OF A LIGHT SCANNING MICROSCOPE

CROSS REFERENCE TO RELATED APPLICATIONS

This application is a continuation of International Application No. PCT/EP2012/060879, filed Jun. 8, 2012, which claims priority of German Application No. 10 2011 077 327.4, filed Jun. 9, 2011, both of which are incorporated herein by reference in their entireties.

BACKGROUND OF THE INVENTION (1) Field of the Invention

The invention relates to a beam combiner for combining two illuminating beams of a light scanning microscope that can be independently scanned.

(2) Description of Related Art Including Information Disclosed Under 37 CFR 1.97 and 1.98

In light scanning microscopy, there is a need to overlay two or more scanned illuminating beams. The overlay of a fluorescence excitation beam with a manipulation beam that manipulates the fluorescence properties of the sample at specific places (e.g., by bleaching the sample) is referenced as an example.

Dichroic beam splitters are known in the art use as for beam combiners. They have the limitation that it must be possible to adequately distinguish between the wavelengths of the light beams to be combined. Also, there is only limited flexibility with respect to the wavelengths used for a given beam splitter. The result is that, when the wavelength of one or both illumination beams is changed, the dichroic beam splitter must be exchanged. Changing mechanisms for this purpose are known, but they must meet high precision requirements and therefore are costly to manufacture.

So-called neutral splitters are one alternative. While they are in no way restrictive with regard to the wavelengths that are used, they necessarily result in losses of intensity when the illuminating beams are combined.

BRIEF SUMMARY OF THE INVENTION

In view of the above, the object of the invention is to present a beam combiner for combining two independently scannable illuminating beams of a light scanning microscope that provides complete flexibility with regard to the wavelength of the illuminating beams and does not cause any disruptive losses of intensity in the two illuminating beams.

This objective is achieved according to the invention with a beam combiner for combining two independently scannable illuminating beams of a light scanning microscope. The beam combiner comprises a first beam path which guides a first illuminating beam along a first optical axis and has a first optical device which combines the first illuminating beam in an intermediate image plane; a second beam path which guides a second illuminating beam along a second optical axis that intersects the first optical axis at a point of intersection lying in the intermediate image plane, or near the intermediate image plane, and which has a scanner for deflecting the second illuminating beam, the scanner being arranged before the point of intersection of the optical axes in the propagation direction of the second illuminating beam; a coupling-in unit which is arranged at the point of intersection of the optical axes and which either has a mirror surface having an aperture opening at the point of incidence of the first optical axis, or is transparent except for a mirror element lying at the point of incidence of the first optical axis, the size of the aperture opening, or of the mirror element, corresponding to the cross-section that the first illuminating beam covers at the point of incidence and thereby allowing the first illuminating beam to pass or reflecting the first illuminating beam, the first and second illuminating beams propagating as a combined illuminating beam after the coupling-in unit.

The beam combiner has a coupling-in unit having a mirror surface. It is located at the point of intersection of the optical axes of the illuminating beam paths in which the illuminating beams are guided. At least the first beam path is configured in this case in such a way that the first illuminating beam is focused in an intermediate image plane. The mirror surface has an aperture opening at the point of incidence of the optical axis, preferably in the intermediate image plane, so that the first illuminating beam can pass through the mirror without loss. The second illuminating beam is instead deflected at the mirror. The orientation of the mirror surface is selected in such a way that the two beams subsequently propagate as a combined illuminating beam.

Because the coupling-in unit is arranged in front of a scanner in the second beam path, the second illuminating beam can easily be deflected relative to the first beam path. The result of this deflection is that the point of incidence of the second illuminating beam on the mirror surface depends on the displacement of the scanner for the deflection of the second illuminating beam. As long as this point of incidence does not coincide completely or partially with the aperture opening, the second illuminating beam is also coupled in without loss. There is no coupling-in, or loss-heavy coupling-in, only in the case of scanner positions in which the second illuminating beam falls on the aperture opening. However, this property is exceptionally advantageous for laser scanning microscopy if the second illuminating beam is a beam for sample manipulation. It would then be advantageous to absolutely prevent the sample manipulation beam from hitting the same sample surface as the excitation beam. If such a situation were to occur, damage could occur to the detector of the laser scanning microscope.

The design can also be inverted, whereby the coupling-in unit is transparent except for a mirror element lying in the area of the point of incidence of the optical axis that deflects the first illuminating beam. The second illuminating beam is then transmitted provided that it does not hit the back side of the mirror element.

The beam combiner according to the invention makes it unnecessary to implement elaborate safety measures to prevent the second illuminating beam from being directed toward the same spot in the sample as the first illuminating beam. Such safety measures are known, for example, from U.S. Pat. No. 7,560,709 A1.

Given the consideration that, on the one hand, propagation of the first illuminating beam that is absolutely identical with the second illuminating beam in the combined illuminating beam is to be avoided, but, on the other hand, no weakening of the second illuminating beam is to occur for even slight deviations if possible, it is preferable for the second illuminating beam path to have a second optical unit that brings the second illuminating beam to a focus that is at the point of intersection of the two optical axes if the scanner for deflection of the second illuminating beam is not displaced.

For most applications, an effort is made to propagate the second illuminating beam in the combined illuminating beam along the same optical axis as the first illuminating beam into which the second one was coupled. This is especially easy to achieve if the mirror surface is flat and perpendicular to a line running through the point of intersection of the two optical axes and bisects an angle between the optical axes. The flat mirror surface is thus perpendicular to the angle bisector of the two optical axes through the point of intersection.

For light scanning microscopy, it is expedient to deflect the combined illuminating beam. For this purpose, a scanner for deflection of the combined illuminating beam is arranged after the coupling-in unit.

The first illuminating beam is expediently focused in the intermediate image plane on a punctiform spot. The aperture opening can be configured as a pinhole, in particular a round pinhole. The area of the aperture opening is then especially small with respect to the mirror surface.

If a rapid deflection of the first illuminating beam is desired, it is expedient to arrange the coupling-in unit in front of a scanner for single-axis deflection of the first illuminating beam. If the first optical device continues to focus the first illuminating beam on a punctiform spot in the intermediate image plane, the aperture opening is configured as a slot that is adapted to the single-axis deflection. This means that when there is any displacement of the scanner for the single-axis deflection of the first illuminating beam, the focus of the first illuminating beam falls on the slot. It is expedient to position the deflection axis of the scanner for single-axis deflection of the first illuminating beam parallel to the second optical axis and, in particular, in the plane that extends from the first optical axis and second optical axis. Then the aperture opening configured as a slot can be a straight gap. This design also can be inverted. Then the slot is replaced by an elongated mirror element.

If it is desirable to adjust the direction of the single-axis deflection of the first illuminating beam, it is expedient to couple the coupling-in unit and the scanner with a rotation device that synchronously adjusts these two elements. "Synchronous adjustment" in this case means that the fanning-out area in which the scanner for single-axis deflection adjusts the first illuminating beam always coincides with the aperture opening configured as a slot.

The optical design is preferably configured as a so-called 4f arrangement in which the first and the second optical devices have the same focal distance, and a third optical device having a focal distance is arranged between the coupling-in unit and the scanner for deflection of the combined illuminating beam, the scanner for the deflection of the combined illuminating beam being at a distance from the point of intersection that is twice the focal distance, and the third optical device being centered between the point of intersection and that of the scanner for deflection of the combined illuminating beam.

The beam combiner according to the invention is always configured in such a way that the first illuminating beam and the second illuminating beam are provided for it as parallel beam bundles. It can be used expediently in a light scanning microscope that has corresponding sources for providing the first and second illuminating beams. In this case the first source, which provides the first illuminating beam, can be suitably configured to excite fluorescence of a sample, and the second sample can be configured for manipulation of fluorescence properties of the sample.

It goes without saying that the features mentioned above and the features to be explained below can be used not just in the specified combinations, but also in other combinations or by themselves without exceeding the bounds of the present invention.

BRIEF DESCRIPTION OF THE SEVERAL VIEWS OF THE DRAWINGS

The invention is explained further below on the basis of the attached drawings which also disclose features important to the invention. Shown in the drawing are.

DETAILED DESCRIPTION OF THE INVENTION

Figure 1:
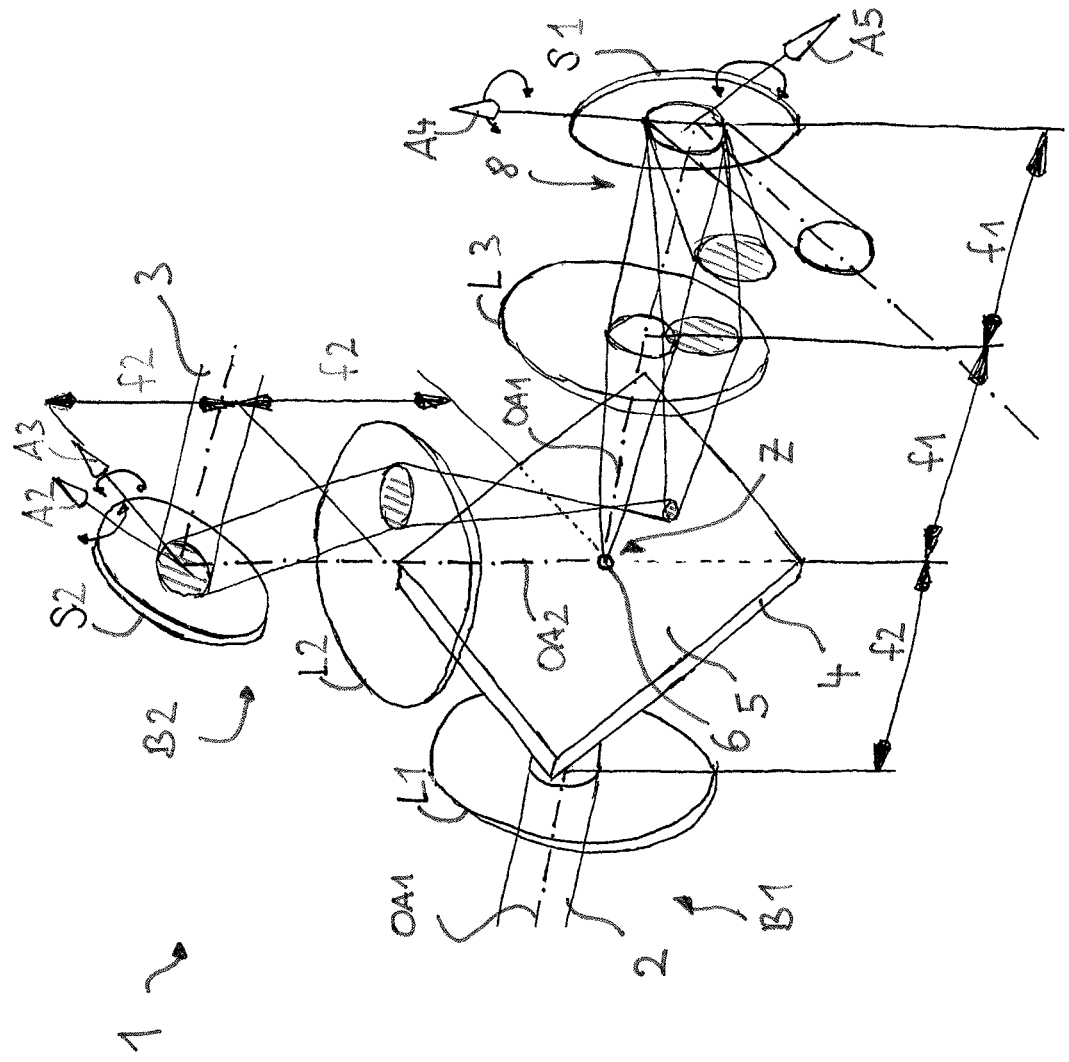
FIG. 1 a diagrammatic illustration of a beam combiner incorporating the present invention for use in a laser-scanning microscope, and FIG. 2 another embodiment of an inventive beam combiner similar to that of FIG. 1.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 diagrammatically shows a beam combiner 1 which is configured for use in a light scanning microscope. The beam combiner 1 combines a first illuminating beam, which may be represented by an excitation beam 2, with a second illuminating beam, which in the described embodiment may be a manipulation beam 3. For clearer distinction, the cross-section of the manipulation beam 3 is cross-hatched in the illustration of FIG. 1. The beam combiner 1 is configured in such a way that the first and second illuminating beams are provided as parallel beam bundles. The excitation beam 2 is guided in a first beam path B1. The manipulation beam 3 is guided in a second beam path B2.

The excitation beam 2 is combined with manipulation beam 3 so that the two then exist as a combined beam. For this purpose, a mirror 4 having a mirror surface 5 is provided. The mirror surface 5 has a hole 6 which is arranged precisely at the position at which a lens L1 brings the excitation beam 2 into focus. The excitation beam 2 can thus pass through the mirror 4. It is then converted by a lens L3 back into a parallel bundle of beams of beams.

The lens L1 creates an intermediate image plane for the punctiform illumination which is created using the excitation beam 2. The intermediate image is located precisely in the hole 6. The mirror surface 5 intersects the intermediate image plane in the hole 6. The excitation beam 2 thus propagates along an optical axis OA1, and the hole 6 of the mirror 4 is situated exactly at the penetration point of optical axis OA1 through the mirror surface 5.

The manipulation beam 3 is also directed onto the mirror—along an optical axis OA2 which intersects the optical axis OA1 at a point of intersection Z. In the embodiment shown in FIG. 1, optical axes OA1 and OA2 intersect at a right angle. However, this is optional. Nevertheless, mirror 4 is always configured in such a way that mirror surface 5 is perpendicular to the angle bisector between optical axes OA1 and OA2 at point of intersection Z.

Located in the second beam path B2 is a scanner S2 that deflects the manipulation beam 3 relative to the optical axis OA2 of the second beam path B2 with respect to two deflection axes A2, A3. The second beam path B2 also has a lens L2 after scanner S2 which brings manipulation beam 3 into a focus which also lies at the point of intersection Z, if scanner S2 is not displaced. Thus, the displacement by scanner S2 causes the manipulation beam 3 to hit at different points on the mirror surface 5 depending on the scanner position. It is reflected there and then parallelized by lens L3 in a manner analogous to the excitation beam 2.

The design according to FIG. 1 can also be inverted by replacing the mirror 4 with a transparent element, wherein a mirror element takes the place of hole 6. Then, the optical axis OA1 on this mirror element is deflected perpendicularly downward, and lens L3 as well as scanner S1 are swung perpendicularly downward with respect to the illustration of FIG. 1. The effect is the same. The excitation beam 2 is reflected on the mirror element that is situated in the position of hole 6. Manipulation beam 3 is then always transmitted through the coupling-in element if it is not directed to the back side of the mirror element. Apart from the fact that the combined beam path 8 is then swung perpendicularly downward with respect to the illustration of FIG. 1, this does not result in any important differences.

Lens L3 is arranged after a scanner S1 which deflects the combined beam 8 biaxially on two deflection axes A4 and A5.

The lenses L1 and L2 each have a focal distance f2. The lens L3 has a focal distance f1. This 4-f imaging ensures that the combined beam 8 forms a single spot on the scanner S1 in which the re-parallelized excitation beam 2 is overlaid with the re-parallelized manipulation beam 3. Via the 4-f imaging, the scanner S2 is still imaged on scanner S1 which is situated in the exit pupils of the beam combiner 1. With this arrangement, the combined beam can be deflected by the scanner S1. In the combined beam 8, the manipulation beam 3 is deflected by the scanner S2 relative to excitation beam 2.

The beam combiner 1 automatically ensures that the excitation beam 2 and manipulation beam 3 cannot completely coincide in the combined beam 8, because this would then only be possible if the scanner S2 would direct the manipulation beam 3 exactly to the point of intersection Z of the optical axes OA1 and OA2. However, hole 6 is located here so that manipulation beam 3 cannot be reflected there. This property ensures that radiation from the manipulation beam 3 cannot fall on the same spot in a sample as radiation from excitation beam 2. Thus, the manipulation beam 3 cannot be undesirably detected in the case of a confocal detection in the microscope in which the beam combiner is installed. It is therefore impossible for a detector to be inadvertently damaged.

Figure 2:
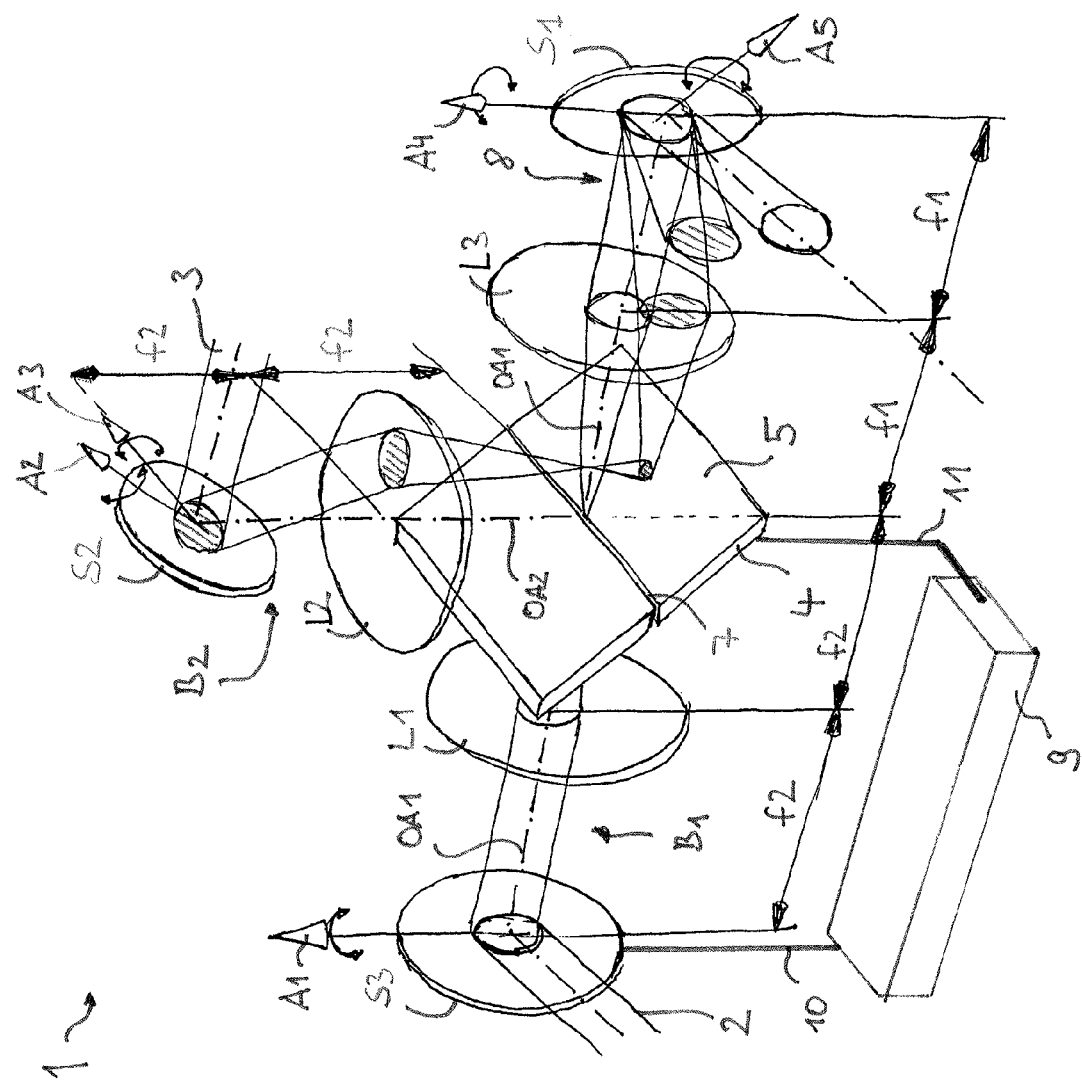

FIG. 2 shows a further development of the beam combiner 1 of FIG. 1. Elements that correspond functionally or identically are provided with the same reference numeral and letter designations in the two figures. The structure of FIG. 2 essentially corresponds to the one in FIG. 1 but is supplemented with a scanner for single-axis deflection of the excitation beam 2 that is arranged in first beam path B1. Scanner S3 deflects the excitation beam 2 on a deflection axis A1. Therefore, the focus produced by lens L1 is scanned in the intermediate image plane perpendicular to the optical axis OA1. The aperture opening in the mirror surface 5 is therefore replaced by a slot 7. This slot, as clarified in the illustration of FIG. 2, is straight because deflection axis A1 is parallel to optical axis OA2 and thus lies in the plane that extends from the optical axes OA1 and OA2. In the case of other geometries, slot 7 can configured to be appropriately curved.

The inversion explained with reference to FIG. 1, in which the mirror 5 is replaced by a transparent element, can of course also be used in FIG. 2. The slot 7 is then to be configured as an elongated mirror element. Otherwise, what was said about the aforementioned variation also applies analogously with respect to the variation of FIG. 2. Mirror S3 can preferably be configured as a resonant oscillating mirror in order to achieve especially rapid deflection.

If it is desired to create deflection axis A1 of mirror S3, a further development is suitable which is likewise already entered in FIG. 2. It comprises a rotation device 9 which is connected to scanner S3 and mirror 4 via suitable operative connections 10 and 11. It rotates the optical axis A1 with respect to optical axis OA1 and synchronously rotates mirror 4 with respect its surface normal, i.e., the angle bisector between the optical axes OA1 and OA2. The rotation occurs synchronously, i.e., the respective angles of rotation are equal. This ensures that the fanning-out of excitation beam 2 by scanner S3 always coincides with slot 7 or, in the described inverted version, with the mirror element.

The scanners described here can be biaxially deflecting scanners. However, a combination of two monoaxially deflecting scanners, preferably with suitable pupil imaging, is also possible.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically disclosed.

What is claimed is:

1. A light scanning microscope having an intermediate image plane and comprising:

first and second illuminating beam sources for respectively providing first and second illuminating beams that can be independently scanned;

a first beam path which guides the first illuminating beam along a first optical axis;

a second beam path which guides the second illuminating beam along a second optical axis that intersects the first optical axis at a point of intersection lying in or near the intermediate image plane; and a beam combiner for combining the first and second illuminating beams, the beam combiner including:

a first optical device in the first beam path for focusing the first illuminating beam at a spot in the intermediate image plane;

a first scanner in the second beam path for deflecting the second illuminating beam, wherein the first scanner is arranged before the point of intersection of the first and second optical axes in a propagation direction of the second illuminating beam;

a coupling-in unit which is arranged at the point of intersection of the first and second optical axes and which has a mirror surface having an aperture opening at a point of incidence of the first optical axis, wherein a size of the aperture opening corresponds to a cross-section that the first illuminating beam covers at the point of incidence and thus allows the first illuminating beam to pass, wherein the first and second illuminating beams propagate as a combined illuminating beam after the coupling-in unit;

a second scanner for deflecting the combined illuminating beam, wherein the second scanner is arranged after the coupling-in unit; and a third scanner for single-axis deflection of the first illuminating beam, the third scanner being arranged in the first beam path and before the coupling-in unit, and wherein the aperture opening is elongated corresponding to the single-axis deflection.

2. The light scanning microscope according to claim 1, wherein the mirror surface is flat and lies perpendicular to a line that runs through the point of intersection of the two optical axes and bisects an angle between the optical axes.

3. The light scanning microscope according to claim 1, wherein the first optical device focuses the first illuminating beam in the intermediate image plane on a spot, and wherein the aperture opening is configured as a pinhole.

4. The light scanning microscope according to claim 1, further comprising a rotation device which is joined to the coupling-in unit and the third scanner for single-axis deflection of the first illuminating beam and is configured to synchronously rotate the coupling-in unit and the third scanner for the single-axis deflection of the first illuminating beam, wherein the rotation device rotates the coupling-in unit with respect to a surface normal to the mirror surface, and the third scanner with respect to the first optical axis.

5. The light scanning microscope according to claim 1, further comprising a second optical device which is arranged in the second beam path and focuses the second illuminating beam at the point of intersection of the optical axes if the first scanner for deflecting the second illuminating beam is not displaced.

6. The light scanning microscope according to claim 5, wherein the first and second optical devices have the same focal distance, and a third optical device is arranged between the coupling-in unit and the second scanner for deflecting the combined illuminating beam and has a focal distance, wherein the second scanner for deflecting the combined illuminating beam is at a distance from the point of intersection of twice the focal distance, and the third optical device is centered between the point of intersection and the second scanner for deflecting the combined illuminating beam.

7. The light scanning microscope according to claim 1, wherein the first illumination source is configured for fluorescence excitation of a sample, and the second illumination source is configured for manipulating fluorescence properties of the sample.

8. A light scanning microscope having an intermediate image plane and comprising:
   first and second illuminating beam sources for respectively providing first and second illuminating beams that can be independently scanned;
   a first beam path which guides the first illuminating beam along a first optical axis;
   a second beam path which guides the second illuminating beam along a second optical axis that intersects the first optical axis at a point of intersection lying in or near the intermediate image plane; and
   a beam combiner for combining the first and second illuminating beams, the beam combiner including:
      a first optical device in the first beam path for focusing the first illuminating beam at a spot in the intermediate image plane;
      a first scanner in the second beam path for deflecting the second illuminating beam, wherein the first scanner is arranged before the point of intersection of the first and second optical axes in a propagation direction of the second illuminating beam;
      a coupling-in unit which is arranged at the point of intersection of the first and second optical axes and which has a mirror surface that is transparent except for a mirror element lying at a point of incidence of the first optical axis, wherein a size of the mirror element corresponds to a cross-section that the first illuminating beam covers at the point of incidence and thus reflects the first illuminating beam, wherein the first and second illuminating beams propagate as a combined illuminating beam after the coupling-in unit;
      a second scanner for deflecting the combined illuminating beam, wherein the second scanner is arranged after the coupling-in unit; and
      a third scanner for single-axis deflection of the first illuminating beam, the third scanner being arranged in the first beam path and before the coupling-in unit, and wherein the mirror element is elongated corresponding to the single-axis deflection.

9. The light scanning microscope according to claim 8, wherein the first optical device focuses the first illuminating beam in the intermediate image plane on a spot, and wherein the mirror element is configured as a circular shape.

10. The light scanning microscope according to claim 8, further comprising a rotation device which is joined to the coupling-in unit and the third scanner for single-axis deflection of the first illuminating beam and is configured to synchronously rotate the coupling-in unit and the third scanner for the single-axis deflection of the first illuminating beam, wherein the rotation device rotates the coupling-in unit with respect to a surface normal to the mirror element, and the third scanner with respect to the first optical axis.

11. The light scanning microscope according to claim 8, further comprising a second optical device which is arranged in the second beam path and focuses the second illuminating beam at the point of intersection of the optical axes if the first scanner for deflecting the second illuminating beam is not displaced.

12. The light scanning microscope according to claim 11, wherein the first and second optical devices have the same focal distance f2, and the beam combiner further comprises a third optical device arranged between the coupling-in unit and the second scanner for deflecting the combined illuminating beam and has a focal distance f1, wherein the second scanner for deflecting the combined illuminating beam is at a distance from the point of intersection of twice the focal distance f1, and the third optical device is centered between the point of intersection and the second scanner for deflection of the combined illuminating beam.

13. The light scanning microscope according to claim 8, wherein the mirror surface is flat and lies perpendicular to a line that runs through the point of intersection of the two optical axes and bisects an angle between the optical axes.

* * * * *